United States Patent
Krill et al.

(10) Patent No.: US 12,479,789 B2
(45) Date of Patent: Nov. 25, 2025

(54) PROCESS FOR DISTILLATIVE PURIFICATION OF UNSATURATED CARBOXYLIC ANHYDRIDES

(71) Applicant: EVONIK OPERATIONS GMBH, Essen (DE)

(72) Inventors: Steffen Krill, Mühltal (DE); Dirk Bröll, Langen (DE)

(73) Assignee: EVONIK OPERATIONS GMBH, Essen (DE)

( * ) Notice: Subject to any disclaimer, the term of this patent is extended or adjusted under 35 U.S.C. 154(b) by 1003 days.

(21) Appl. No.: 17/621,840

(22) PCT Filed: Jun. 24, 2020

(86) PCT No.: PCT/EP2020/067660
§ 371 (c)(1),
(2) Date: Dec. 22, 2021

(87) PCT Pub. No.: WO2020/260371
PCT Pub. Date: Dec. 30, 2020

(65) Prior Publication Data
US 2022/0356142 A1    Nov. 10, 2022

(30) Foreign Application Priority Data

Jun. 25, 2019  (EP) .................................. 19182175

(51) Int. Cl.
*C07C 51/573*    (2006.01)

(52) U.S. Cl.
CPC .................. *C07C 51/573* (2013.01)

(58) Field of Classification Search
CPC ....... C07C 51/573; C07C 57/04; C07C 51/50; C07B 63/04
See application file for complete search history.

(56) References Cited

U.S. PATENT DOCUMENTS

| | | | |
|---|---|---|---|
| 5,364,945 A * | 11/1994 | Cai | ......................... C07C 69/54 549/253 |
| 6,936,734 B2 | 8/2005 | Schmitt et al. | |
| 7,714,165 B2 | 5/2010 | Broell et al. | |
| 8,084,640 B2 | 12/2011 | Broell et al. | |
| 8,337,671 B2 | 12/2012 | Broell et al. | |
| 11,027,245 B1 | 6/2021 | Bröll et al. | |
| 2003/0205451 A1 * | 11/2003 | Briegel | ................... C07C 51/50 203/1 |
| 2003/0220510 A1 * | 11/2003 | Guggenheim | ........ C07C 51/573 202/160 |
| 2006/0287548 A1 * | 12/2006 | Hoefer | .................... C07B 63/04 560/4 |
| 2009/0166176 A1 * | 7/2009 | Broell | ................... C07C 51/573 203/65 |
| 2010/0069666 A1 | 3/2010 | Broell et al. | |

FOREIGN PATENT DOCUMENTS

| | | |
|---|---|---|
| CN | 1448668 | * 10/2003 |
| CN | 107963966 | 4/2018 |
| JP | 2004-331599 | 11/2004 |
| JP | 2005-154445 | 6/2005 |
| JP | 2009-541243 | 11/2009 |
| JP | 2009-541407 | 11/2009 |
| JP | 2018-008925 | 1/2018 |

OTHER PUBLICATIONS

CN1448668 translation (Year: 2003).*
Cahill (Automating Manual On Off Valves, pp. 1-8, Published Jan. 2015) (Year: 2015).*
International Search Report for corresponding PCT/EP2020/067660, filed Jun. 24, 2020.
Written Opinion of the International Searching Authority for corresponding PCT/EP2020/067660, filed Jun. 24, 2020.
International Preliminary Report on Patentability for corresponding PCT/EP2020/067660, filed Jun. 24, 2020.
European Search Report and Search Opinion for corresponding EP 19182175.0 filed Jun. 25, 2019, with English language machine translation of the Search Opinion attached.

* cited by examiner

*Primary Examiner* — Andrew D Kosar
*Assistant Examiner* — Blaine G Doletski
(74) *Attorney, Agent, or Firm* — Grüneberg and Myers PLLC

(57) ABSTRACT

The invention relates to a process for distillative removal of a unsaturated carboxylic anhydride of the general formula (I) R—C(O)—O—C—(O)—R in which R is an unsaturated organic radical having 2 to 12 carbon atoms, wherein said unsaturated carboxylic anhydride is discharged in gaseous form from a sidestream take-off and is condensed in an atomized liquid circulating stream of said unsaturated carboxylic anhydride.

20 Claims, 2 Drawing Sheets

PROCESS FOR DISTILLATIVE PURIFICATION OF UNSATURATED CARBOXYLIC ANHYDRIDES

CROSS REFERENCE TO RELATED APPLICATIONS

The present application is US national stage of international application PCT/EP2020/067660, which has an international filing date of Jun. 24, 2020, and which was published on Dec. 30, 2020. The application claims priority to European application EP 19182175.0, filed on Jun. 25, 2019. The content of these applications is hereby incorporated by reference in its entirety.

FIELD OF THE INVENTION

The invention relates to a process for the distillative removal of unsaturated carboxylic anhydrides.

PRIOR ART

EP-2032518 B1 describes a process for the continuous production of carboxylic anhydrides, in which the carboxylic anhydride is obtained at a sidestream preferably between a middle and lower region of a rectification column.

CN-107963966 A describes an apparatus for the production of methacrylic anhydride, in which the methacrylic anhydride is obtained at an outlet at the bottom of a rectification column.

A disadvantage of the process mentioned is that, in order to obtain pure methacrylic anhydride, further purification and distillation steps must then follow in order to separate the target product from high-boiling secondary components, including process stabilizers.

The object of the present invention, therefore, is to provide a simplified process for removing unsaturated carboxylic anhydride, in which further purification steps can be omitted and by means of which the target product (i.e. unsaturated carboxylic anhydride) is obtained in a highly pure form. Moreover, the process should ensure that polymerization of the target product is avoided.

SUMMARY OF THE INVENTION

The object is achieved in that, during distillative purification, the unsaturated carboxylic anhydride is discharged in gaseous form by side take-off and is condensed ("quenched") in a cooled liquid stream, wherein this liquid stream is a liquid circulating stream of said unsaturated carboxylic anhydride.

As a result, impurities are excluded, since the gaseous stream from the distillative purification apparatus is substantially more pure than the liquid stream and no further auxiliaries are used which can reduce the purity of the gaseous target product (the unsaturated carboxylic anhydride).

The invention therefore relates to a process for distillative removal of an unsaturated carboxylic anhydride of the general formula (I)

R—C(O)—O—C(O)—R     (I), in which R is an unsaturated organic radical having 2 to 12 carbon atoms, characterized in that the unsaturated carboxylic anhydride of the general formula (I) is discharged in gaseous form from a sidestream take-off and is condensed in an atomized liquid circulating stream of this unsaturated carboxylic anhydride of the general formula (I).

DETAILED DESCRIPTION OF THE INVENTION

Figure 1:
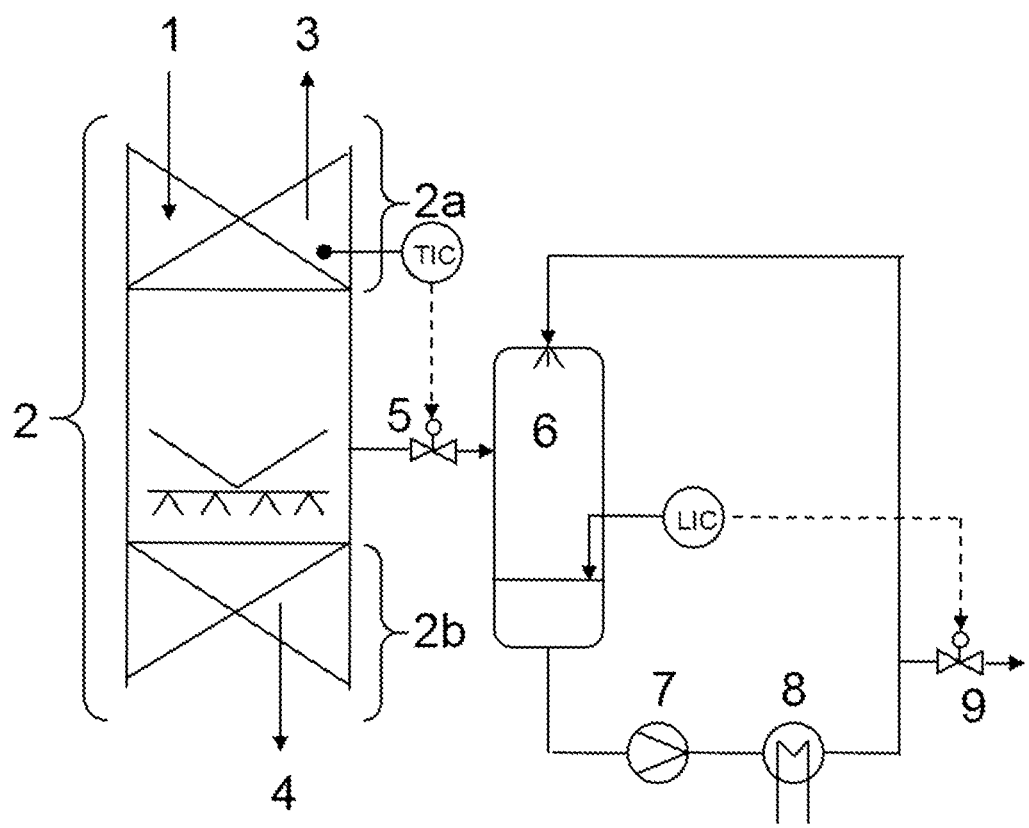
FIG. 1 illustrates schematically the embodiment of the process according to the invention.

The unsaturated carboxylic anhydride of the general formula (I) as defined above is preferably (meth)acrylic anhydride. The term (meth)acrylic anhydride includes the compounds methacrylic anhydride and acrylic anhydride.

In the context of the invention, the term "circulating stream" is understood to mean any circulation of the unsaturated carboxylic anhydride of the general formula (I) in the apparatus operating for removing the unsaturated carboxylic anhydride of the general formula (I), or apparatuses associated thereto.

For the process according to the invention, any distillative purification apparatus can be used, for example a rectification column which has an upper, a middle and a lower section.

Preferably, the rectification column has 5 to 50 separation stages. In the present invention the number of separating stages is to be understood as meaning the number of trays in a tray column multiplied by the tray efficiency or the number of theoretical separating stages in the case of a structured packing column or a column comprising random packings.

Examples of trays in a rectification column comprising trays include bubble cap trays, sieve trays, tunnel trays, valve trays, slit trays, sieve slit trays, sieve bubble cap trays, nozzle trays, centrifugal trays, examples of random packings in a rectification column comprising random packings include Raschig rings, Lessing rings, Pall rings, Berl saddles, Intalox saddles, and examples of structured packings in a rectification column comprising structured packings include the Mellapak (Sulzer), Rombopak (Kühni) and Montz-Pak (Montz) types and structured packings comprising catalyst bags, for example Katapak (Sulzer).

A rectification column comprising combinations of regions of trays, of regions of random packings and/or of regions of structured packings may likewise be employed.

It is preferable to employ a rectification column comprising random packings and/or structured packings. The rectification column may be produced from any material suitable therefor. These include, inter alia, stainless steel and inert materials.

Preferably, the rectification column is operated under vacuum at an absolute pressure of 1 to 500 mbar, preferably at an absolute pressure of 1 to 100 mbar. The temperature at the bottom of the rectification column is a result of the prevailing system pressure.

Low-boiling impurities are withdrawn from the head of the rectification column, high-boiling impurities being discharged from the bottom of the rectification column. The target product (i.e. the unsaturated carboxylic anhydride of the general formula (I)) is preferably discharged at a side take-off below the middle region of the rectification column.

The rectification column can also be interconnected with other apparatuses, such as further apparatuses for substance separation and/or a reactor. A reaction region can also be positioned within the rectification column. The rectification column can also be subdivided into two or more separation segments which fulfil different tasks.

For the process according to the invention, an apparatus is preferably used having a container that is sealed to the atmosphere, which is linked to the distillative purification apparatus via a fitting. This container can be constructed without cooling elements, preferably with cooling elements (as heat exchanger). The apparatus also has an output line in which the liquid target product (the unsaturated carboxylic anhydride of the general formula (I)) is withdrawn, which is preferably further cooled via a heat exchanger, and which is partly fed back (recirculating stream) to the apparatus via an inlet line.

Preferably, a nozzle is located at the end of the inlet line, with which the liquid target product is sprayed into the container and thus a negative pressure is generated in which the gaseous target product (the unsaturated carboxylic anhydride of the general formula (I)) can be better condensed from the distillative purification apparatus. The fill level of the circulating liquid target product in the container is constantly maintained, which is effected preferably with the aid of an automatically regulated fill level measurement. Excess liquid target product is withdrawn via a pipeline and is collected in a target product container.

The fittings used, which connect the container with the distillative purification apparatus, can be a valve, ball valve or a flap which is regulated manually, preferably automatically. As regulating variable in this case, a measurement and regulating point located in the distillative purification apparatus is used, preferably a temperature measurement point. The measurement point can be located above, at the same height or below the fitting, which connects the container with the distillative purification apparatus, or the sidestream take-off, preferably above. Preferably, the sidestream take-off is regulated by a temperature-regulated valve.

The apparatus may also have further connections, which can be used for measuring instruments (for example pressure and temperature sensors) or sight glasses. The apparatus may be produced from any material suitable therefor. These include, inter alia, stainless steel and inert materials.

In order to avoid undesirable polymerization of the unsaturated carboxylic anhydride of the general formula (I), a polymerization inhibitor is optionally added. Preferred polymerization inhibitors that may be used include, inter alia, octadecyl 3-(3,5-di-tert-butyl-4-hydroxyphenyl)propionate, phenothiazine, hydroquinone, hydroquinone monomethyl ether, 4-hydroxy-2,2,6,6-tetramethylpiperidinooxyl (TEMPOL), 2,4-dimethyl-6-tert-butylphenol, 2,6-di-tert-butylphenol, 2,6-di-tert-butyl-4-methylphenol, para-substituted phenylenediamines such as for example N,N'-diphenyl-p-phenylenediamine, 1,4-benzoquinone, 2,6-di-tert-butyl-alpha-(dimethylamino)-p-cresol, 2,5-di-tert-butylhydroquinone or mixtures of two or more of these polymerization inhibitors.

The inhibitor is preferably metered in at the head of the column.

High-boilers, such as added inhibitors, can be discharged from the bottom of the column by customary methods, for example by a thin film evaporator or a similar apparatus for carrying out this task, which recycles evaporated substances to the rectification column and discharges non-evaporated high-boilers.

The process according to the invention enables the unsaturated carboxylic anhydride of the general formula (I) to be obtained by simple separation in high purity without losses due to undesirable polymerization, wherein the unsaturated carboxylic anhydride of the general formula (I) polymerization can then, if desired, be stabilized with polymerization inhibitors for storage.

An embodiment of the process according to the invention is shown schematically in FIG. 1.

The unsaturated carboxylic anhydride of the general formula (I) to be purified (1) reaches the lower section of a rectification column (2). Here, in separation region (2a), components which are lighter boiling (3) than the unsaturated carboxylic anhydride of the general formula (I) are removed. In separation region (2b) of the rectification column, the unsaturated carboxylic anhydride of the general formula (I) is separated from components which are higher boiling (4) than the unsaturated carboxylic anhydride of the general formula (I). The unsaturated carboxylic anhydride of the general formula (I) is withdrawn between separation region (2a) and (2b) in gaseous form at a sidestream take-off via a temperature-regulated valve (5) and is then directly condensed in a container of atomized liquid target product (i.e. unsaturated carboxylic anhydride of the general formula (I) originating from the circulating stream). The liquid target product is recycled to the container (6) with the aid of a pump (7). A heat exchanger (8) cools the liquid target product. The target product is withdrawn (9), controlled by the fill level, from the circulation and is fed to a target product container.

The following examples illustrate the process according to the invention without being limited thereto.

EXAMPLES

Example 1: Purification of Methacrylic Anhydride

The purification of methacrylic anhydride as unsaturated carboxylic anhydride of the general formula (I) was carried out in the lower section of a rectification column according to FIG. 1.

The rectification column had twelve separating stages in separation region (2a) and eight in separation region (2b). This column had an internal diameter of 100 mm and was equipped with structured packings from Sulzer, type CY (separation region 2a) and from Montz, type BSH 400 (separation region 2b). The pressure in the column bottom was 35 mbar. At stationary conditions, a temperature profile of 164° C. (bottom) to 66° C. (upper end of separation region 2a) was set. The output of methacrylic anhydride at the side take-off (between separation region 2a and 2b) and the heating steam capacity of the bottom evaporator was temperature-regulated in the respective regions.

Phenothiazine was used as process stabilizer, which was added dissolved in acetic acid to the return flow to the rectification column via the overhead. A falling film evaporator served as evaporator.

At the sidestream take-off, gaseous methacrylic anhydride was condensed in atomized liquid methacrylic anhydride already present. The pressure in the container was 25 mbar absolute; the pressure in the rectification column at the position of the take-off prior to the valve (5) was 30 mbar absolute. The liquid methacrylic anhydride was cooled to a temperature of 10° C. with a tube coil heat exchanger (8), which was operated with cold brine. Clear and colourless (platinum-cobalt colour number 5) methacrylic anhydride having a purity of 99.7% (GC analysis) was withdrawn via the outlet line.

Example 2: Purification of Acrylic Anhydride

The purification of acrylic anhydride as unsaturated carboxylic anhydride of the general formula (I) was carried out in the same lower section of a rectification column according to FIG. 1 as elucidated in Example 1. The pressure in the column bottom was 35 mbar. At stationary conditions, a temperature profile of 164° C. (bottom) to 54° C. (upper end of separation region 2a) was set. The output of acrylic anhydride at the side take-off (between separation region 2a and 2b) and the heating steam capacity of the bottom evaporator was temperature-regulated in the respective regions. Phenothiazine was used as process stabilizer, which was added dissolved in acetic acid to the return flow to the rectification column via the overhead. A falling film evaporator served as evaporator.

At the sidestream take-off, gaseous acrylic anhydride was condensed in atomized liquid acrylic anhydride already present. The pressure in the container was 25 mbar absolute; the pressure in the rectification column at the position of the take-off prior to the valve (5) was 30 mbar absolute. The liquid acrylic anhydride was cooled to a temperature of 10° C. with a tube coil heat exchanger (8), which was operated with cold brine. Clear and colourless (platinum-cobalt colour number 6) acrylic anhydride having a purity of 99.7% (GC analysis) was withdrawn via the outlet line.

Comparative Example 1: Purification of Methacrylic Anhydride

Figure 2:
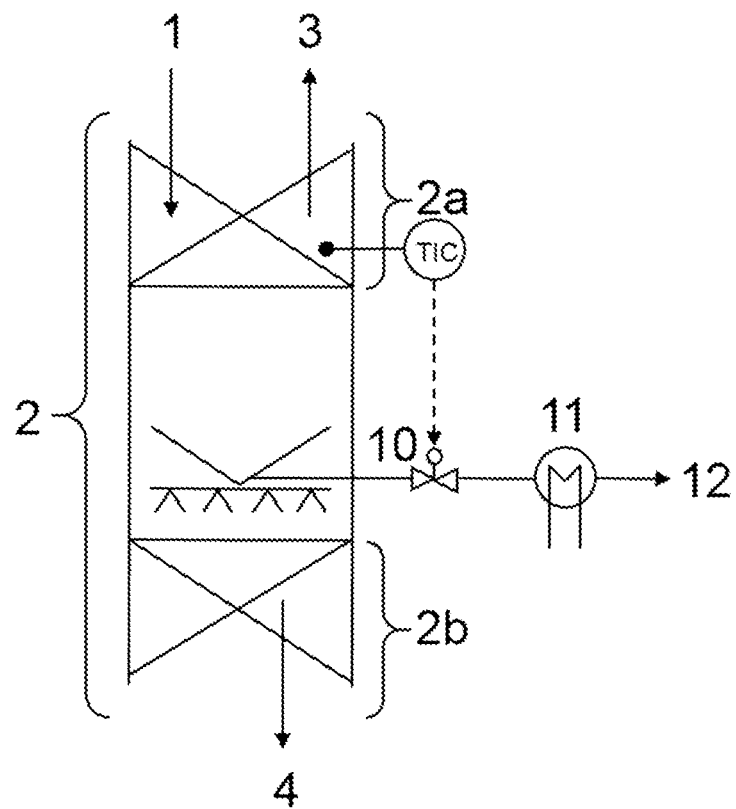
FIG. 2 illustrates a rectification column used in the purification of methacrylic anhydride.

The purification of methacrylic anhydride as unsaturated carboxylic anhydride of the general formula (I) was carried out in the lower section of a rectification column according to FIG. 2.

The rectification column had twelve separating stages in separation region (2a) and eight in separation region (2b). This column had an internal diameter of 100 mm and was equipped with structured packings from Sulzer, type CY (separation region 2a) and from Montz, type BSH 400 (separation region 2b). The pressure in the column bottom was 35 mbar. At stationary conditions, a temperature profile of 164° C. (bottom) to 66° C. (upper end of separation region 2a) was set. The output of methacrylic anhydride at the side take-off (between separation region 2a and 2b) and the heating steam capacity of the bottom evaporator was temperature-regulated in the respective regions.

Phenothiazine was used as process stabilizer, which was added dissolved in acetic acid to the return flow to the rectification column via the overhead. A falling film evaporator served as evaporator.

Liquid methacrylic anhydride was withdrawn at the sidestream take-off. The liquid methacrylic anhydride was cooled to a temperature of 10° C. with a tube coil heat exchanger (8), which was operated with cold brine. Methacrylic anhydride as clear pale yellow liquid (platinum-cobalt colour number 35) having a purity of 99.2% (GC analysis) was withdrawn via the outlet line.

Comparative Example 2: Purification of Acrylic Anhydride

The purification of acrylic anhydride as unsaturated carboxylic anhydride of the general formula (I) was carried out in the same lower section of a rectification column according to FIG. 2 as elucidated in comparative example 1.

The pressure in the column bottom was 35 mbar. At stationary conditions, a temperature profile of 164° C. (bottom) to 54° C. (upper end of separation region 2a) was set. The output of acrylic anhydride at the side take-off (between separation region 2a and 2b) and the heating steam capacity of the bottom evaporator was temperature-regulated in the respective regions. Phenothiazine was used as process stabilizer, which was added dissolved in acetic acid to the return flow to the rectification column via the overhead. A falling film evaporator served as evaporator.

Liquid acrylic anhydride was withdrawn at the sidestream take-off (10). The liquid acrylic anhydride was cooled to a temperature of 10° C. with a tube coil heat exchanger (11), which was operated with cold brine. Acrylic anhydride as clear pale yellow liquid (platinum-cobalt colour number 38) having a purity of 99.1% (GC analysis) was withdrawn via the outlet line (12).

The invention claimed is:

1. A process for distillative removal of an unsaturated carboxylic anhydride of general formula (I):

R—C(O)—O—C—(O)—R  (I), wherein R is an unsaturated organic radical having 2 to 12 carbon atoms, comprising discharging the unsaturated carboxylic anhydride of general formula (1) in gaseous form from a sidestream take-off of a distillative purification apparatus and condensing said unsaturated carboxylic anhydride of general formula (1) in gaseous form in an atomized liquid circulating stream of said unsaturated carboxylic anhydride of general formula (I), wherein said unsaturated carboxylic anhydride is condensed in an apparatus comprising a container that is sealed to the atmosphere and which is linked to the sidestream take-off via a fitting, an output line through which condensed unsaturated carboxylic anhydride of the general formula (I) is withdrawn from said container and of, which a portion thereof is fed back to the container via an inlet line, a nozzle being located at the end of the inlet line, through which the condensed unsaturated carboxylic anhydride is atomized into the container and thus a negative pressure is generated in which the gaseous unsaturated carboxylic anhydride of the general formula (I) can be condensed from the sidestream take-off of said distillative purification apparatus, wherein the unsaturated carboxylic anhydride of the general formula (I) is methacrylic anhydride or acrylic anhydride.

2. The process of claim 1, wherein the fitting used can be a valve, ball valve or a flap which is regulated automatically.

3. The process of claim 1, wherein the temperature of the liquid circulating stream of the unsaturated carboxylic anhydride of general formula (I) is lower than the condensation temperature of the unsaturated carboxylic anhydride of general formula (I).

4. The process of claim 1, wherein the temperature of the liquid circulating stream of the unsaturated carboxylic anhydride of general formula (I) is between minus 50° C. and 200° C.

5. The process of claim 1, wherein the temperature of the liquid circulating stream of the unsaturated carboxylic anhydride of general formula (1) is between −10° C. and 50° C.

6. The process of claim 1, wherein the pressure during removal of the unsaturated carboxylic anhydride of general formula (I) is between 1 mbar and 500 mbar absolute.

7. The process of claim 1, wherein the pressure during removal of the unsaturated carboxylic anhydride of general formula (I) is between 1 mbar and 100 mbar absolute.

8. The process of claim 1, wherein the distillative removal of the unsaturated carboxylic anhydride of general formula (I) is carried out in a rectification column which has an upper, a middle and a lower section and the sidestream take-off is located in the middle section or below the middle section.

9. The process of claim 8, wherein the rectification column has a measurement and regulating point which regulates the sidestream take-off and is positioned above the sidestream take-off.

10. The process of claim 9, wherein the sidestream take-off is regulated via a temperature-regulated valve.

11. The process of claim 1, wherein the distillative removal of the unsaturated carboxylic anhydride of general formula (I) is carried out in the presence of a polymerization inhibitor.

12. The process of claim 11, wherein the polymerization inhibitor is selected from the group consisting of: octadecyl 3-(3,5-di-tert-butyl-4-hydroxyphenyl) propionate; phenothiazine; hydroquinone; hydroquinone monomethyl ether; 4-hydroxy-2,2,6,6-tetramethylpiperidinooxyl (TEMPOL); 2,4-dimethyl-6-tert-butylphenol; 2,6-di-tert-butylphenol; 2,6-di-tert-butyl-4-methylphenol; para-substituted phenylenediamines; 1,4-benzoquinone; 2,6-di-tert-butyl-alpha-(dimethylamino)-p-cresol; 2,5-di-tert-butylhydro-quinone; or mixtures of two or more of these polymerization inhibitors.

13. The process according of claim 11, wherein the polymerization inhibitor is added at the column head.

14. The process of claim 3, wherein the temperature of the liquid circulating stream of the unsaturated carboxylic anhydride of general formula (D) is between -10° C. and 50° C.

15. The process of claim 14, wherein the pressure during removal of the unsaturated carboxylic anhydride of general formula (I) is between 1 mbar and 500 mbar absolute.

16. The process of claim 15, wherein the distillative removal of the unsaturated carboxylic anhydride of general formula (I) is carried out in a rectification column which has an upper, a middle and a lower section and the sidestream take-off is located in the middle section or below the middle section.

17. The process of claim 16, wherein the rectification column has a measurement and regulating point, which regulates the sidestream take-off and is positioned above the sidestream take-off.

18. The process of claim 17, wherein the sidestream take-off is regulated via a temperature-regulated valve.

19. The process of claim 2, wherein a measurement and regulating point located in the distillative purification apparatus is used as regulating variable.

20. The process of claim 1, wherein the atomized liquid circulating stream consists of said unsaturated carboxylic anhydride of general formula (I).

* * * * *